United States Patent
Watanabe et al.

(10) Patent No.: US 10,475,211 B2
(45) Date of Patent: Nov. 12, 2019

(54) METHOD, INFORMATION PROCESSING APPARATUS AND NON-TRANSITORY COMPUTER-READABLE STORAGE MEDIUM

(71) Applicant: FUJITSU LIMITED, Kawasaki-shi, Kanagawa (JP)

(72) Inventors: Hiroya Watanabe, Oita (JP); Shinji Shigeno, Oita (JP); Kenji Kodama, Yufu (JP); Akihito Kanamori, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 8 days.

(21) Appl. No.: 15/880,665

(22) Filed: Jan. 26, 2018

(65) Prior Publication Data
US 2018/0260976 A1 Sep. 13, 2018

(30) Foreign Application Priority Data
Mar. 13, 2017 (JP) .................. 2017-047440

(51) Int. Cl.
*G06K 9/00* (2006.01)
*G06T 7/90* (2017.01)
*G06T 7/246* (2017.01)

(52) U.S. Cl.
CPC .......... *G06T 7/90* (2017.01); *G06T 7/248* (2017.01); *G06T 2207/10024* (2013.01)

(58) Field of Classification Search
CPC . G06T 7/90; G06T 7/248; G06T 2207/10024; A01K 29/005

(Continued)

(56) References Cited

U.S. PATENT DOCUMENTS 7,395,966 B2 * 7/2008 Braiman ............... A01K 29/005
                                                235/454
2015/0128878 A1 * 5/2015 Van Curen ......... G06K 9/00671
                                                119/721

(Continued)

FOREIGN PATENT DOCUMENTS

JP   2016-514482      5/2016
WO   2011/154949 A2  12/2011

(Continued)

OTHER PUBLICATIONS

Extended European Search Report dated Jun. 25, 2018 for corresponding European Patent Application No. 18154381.0, 9 pages.

*Primary Examiner* — Van D Huynh
(74) *Attorney, Agent, or Firm* — Fujitsu Patent Center

(57) ABSTRACT

A method performed by a computer, the method includes obtaining a plurality of images each of which includes a plurality of animals, the plurality of animals being attached with a plurality of attachment objects respectively, the attachment objects having respective different colors, using at least one image among the plurality of images, detecting the colors of the plurality of attachment objects respectively, using the plurality of images, detecting movements of the plurality of respective attachment objects, based on the colors of the plurality of attachment objects, and in accordance with the respective movements of the plurality of attachment objects, determining respective activity quantities of the plurality of animals.

3 Claims, 11 Drawing Sheets

(58) Field of Classification Search
USPC .......................................................... 382/103
See application file for complete search history.

(56) References Cited

U.S. PATENT DOCUMENTS

| | | | |
|---|---|---|---|
| 2016/0066546 A1* | 3/2016 | Borchersen | A01K 5/02 382/110 |
| 2016/0125276 A1* | 5/2016 | Spicola, Sr. | A01K 11/008 382/110 |
| 2019/0180077 A1* | 6/2019 | Zhou | G06T 7/248 |

FOREIGN PATENT DOCUMENTS

| | | | | |
|---|---|---|---|---|
| WO | 2013/018068 A1 | 2/2013 | | |
| WO | 2014/118788 A2 | 8/2014 | | |
| WO | WO-2014118788 A2 * | 8/2014 | ........... | A01K 29/005 |

* cited by examiner

FIG. 4

| IDENTIFICATION INFORMATION | | 140b |
|---|---|---|
| COLLAR 6a | HUE | $H_1°\sim H_2°$ |
| | SATURATION | 140~200 |
| | BRIGHTNESS | $B_1\sim B_2$ |
| COLLAR 6b | HUE | $H_3°\sim H_4°$ |
| | SATURATION | 140~200 |
| | BRIGHTNESS | $B_1\sim B_2$ |
| COLLAR 6c | HUE | $H_5°\sim H_6°$ |
| | SATURATION | 140~200 |
| | BRIGHTNESS | $B_1\sim B_2$ |

FIG. 5

| IDENTIFICATION INFORMATION | TIME | COORDINATES |
|---|---|---|
| COLLAR 6a | $t_1$ | xa1, ya1 |
| | $t_2$ | xa2, ya2 |
| | $t_3$ | xa3, ya3 |
| | ... | |
| COLLAR 6b | $t_1$ | xb1, yb1 |
| | $t_2$ | xb2, yb2 |
| | $t_3$ | xb3, yb3 |
| | ... | |
| COLLAR 6c | $t_1$ | xc1, yc1 |
| | $t_2$ | xc2, yc2 |
| | $t_3$ | xc3, yc3 |
| | ... | |

| IDENTIFICATION INFORMATION | ACTIVITY QUANTITY |
|---|---|
| COLLAR 6a | INFORMATION ON ACTIVITY QUANTITY OF A COW 5a HAVING THE COLLAR 6a |
| COLLAR 6b | INFORMATION ON ACTIVITY QUANTITY OF A COW 5b HAVING THE COLLAR 6b |
| COLLAR 6c | INFORMATION ON ACTIVITY QUANTITY OF A COW 5c HAVING THE COLLAR 6c |

140d

METHOD, INFORMATION PROCESSING APPARATUS AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-47440, filed on Mar. 13, 2017, the entire contents of which are incorporated herein by reference.

FIELD

The present disclosure relates to a method, an information processing apparatus and a non-transitory computer-readable storage medium.

BACKGROUND

Dairy farmers not only raise cows, perform milking, and the like, but also assist breeding cows with calf delivery. Here, if the delivery assistance of breeding cows is not suitably carried out, there is an increasing risk of death during or shortly after birth and the death of the dam. As a result, a rancher performs regular patrols and routinely monitoring camera feeds to observe the bovine activity and to determine whether or not there are any signs of an impending calf delivery.

As described above, the regular patrols and routine monitoring camera feeds impose a large burden the rancher. It is therefore desirable that whether or not a cow exhibits any signs of delivery be automatically notified to the rancher. Regarding this demand, for example, a technique is provided in which collars of predetermined colors are attached to respective domestic animals, image analysis is performed, processing for detecting the positions of the collars is repeatedly performed, the activity quantities of the domestic animals are measured, and a determination is made as to whether or not a domestic animal exhibits any signs of delivery. As a related-art technical document, Japanese National Publication of International Patent Application No. 2016-514482 is disclosed.

SUMMARY

According to an aspect of the invention, a method performed by a computer, the method includes obtaining a plurality of images each of which includes a plurality of animals, the plurality of animals being attached with a plurality of attachment objects respectively, the attachment objects having respective different colors, using at least one image among the plurality of images, detecting the colors of the plurality of attachment objects respectively, based on the colors of the plurality of attachment objects, using the plurality of images, detecting movements of the plurality of respective attachment objects, and in accordance with the respective movements of the plurality of detected attachment objects, determining respective activity quantities of the plurality of animals.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of the data structure of recognition parameters.

FIG. 5 is a diagram illustrating an example of the data structure of a detection table.

FIG. 6 is a diagram illustrating an example of the data structure of an activity quantity table.

DESCRIPTION OF EMBODIMENTS

However, there is a problem in that it is not possible to calculate the activity quantities of a plurality of animals by using the above-described related-art technique.

Depending on a farmer, the farmer may accommodate a plurality of domestic animals in the same delivering chamber. For example, if the plurality of domestic animals are included in an image captured by the same camera, it is difficult to distinguish the collar attached to each domestic animal, and thus it has not been possible to calculate the activity quantity of each domestic animal. Here, the collar of a domestic animal has been referred to, but the problem occurs in the same manner when an attachment object other than a collar is attached to a domestic animal, and such an attachment object is detected.

According to one aspect of the invention, it is an object of the present invention to provide an activity quantity calculation program capable of calculating the activity quantities of a plurality of animals, an activity quantity calculation method, an activity quantity calculation apparatus, and an animal monitoring system.

A detailed description will be given of an activity quantity calculation program, an activity quantity calculation method, an activity quantity calculation apparatus, and an animal monitoring system according to embodiments of the present disclosure based on the drawings. In this regard, this invention will not be limited by these embodiments.

Embodiments

Figure 1:
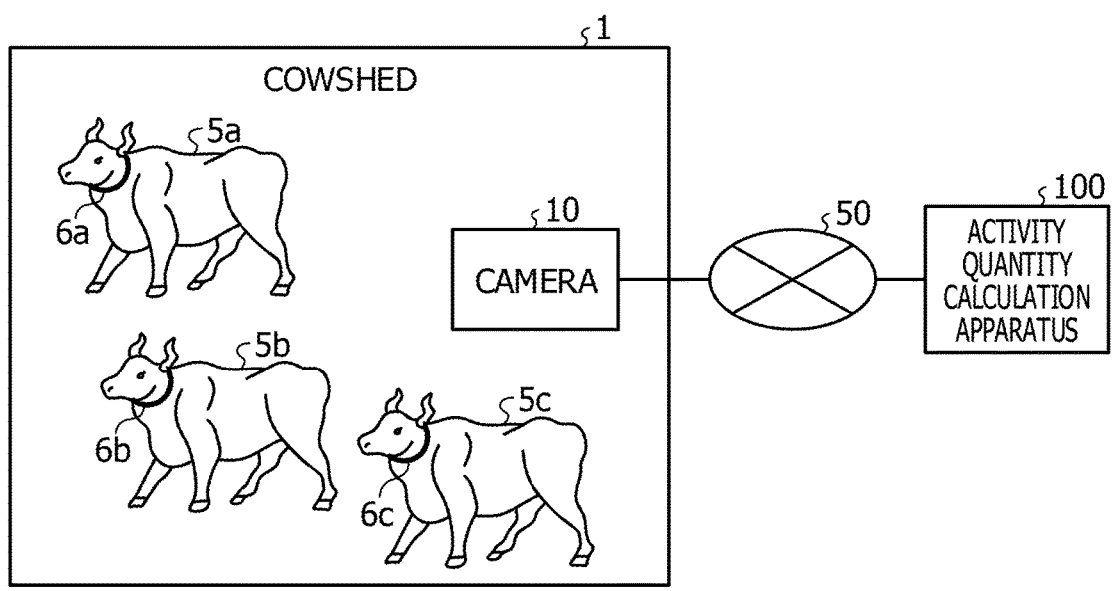
FIG. 1 is a diagram illustrating an example of a system according to the present embodiment.

FIG. 1 is a diagram illustrating an example of a system according to the present embodiment. As illustrated in FIG. 1, this system includes a camera 10 and an activity quantity calculation apparatus 100. The camera 10 and the activity quantity calculation apparatus 100 are mutually coupled via a network 50.

The camera 10 is installed in a cowshed 1. In the cowshed 1, a plurality of cows having collars of predetermined colors are kept. In the example illustrated in FIG. 1, cows 5a, 5b, and 5c are kept. The cows 5a, 5b, and 5c are each fitted with respective collars 6a, 6b, and 6c having different colors.

It is assumed that the imaging range of the camera 10 is sufficient to include the cows 5a, 5b, and 5c. The camera 10 transmits the information of the captured moving image information to the activity quantity calculation apparatus 100. The information of the moving image is information including a plurality of consecutive image frames. In the following description, an image frame is suitably denoted by a captured image.

The activity quantity calculation apparatus 100 is an apparatus that analyzes an image captured by the camera 10 and performs processing to individually detect the collars 6a to 6c attached to the cows 5a to 5c for each captured image so as to calculate the activity quantities of the cows 5a to 5c.

Figure 2:
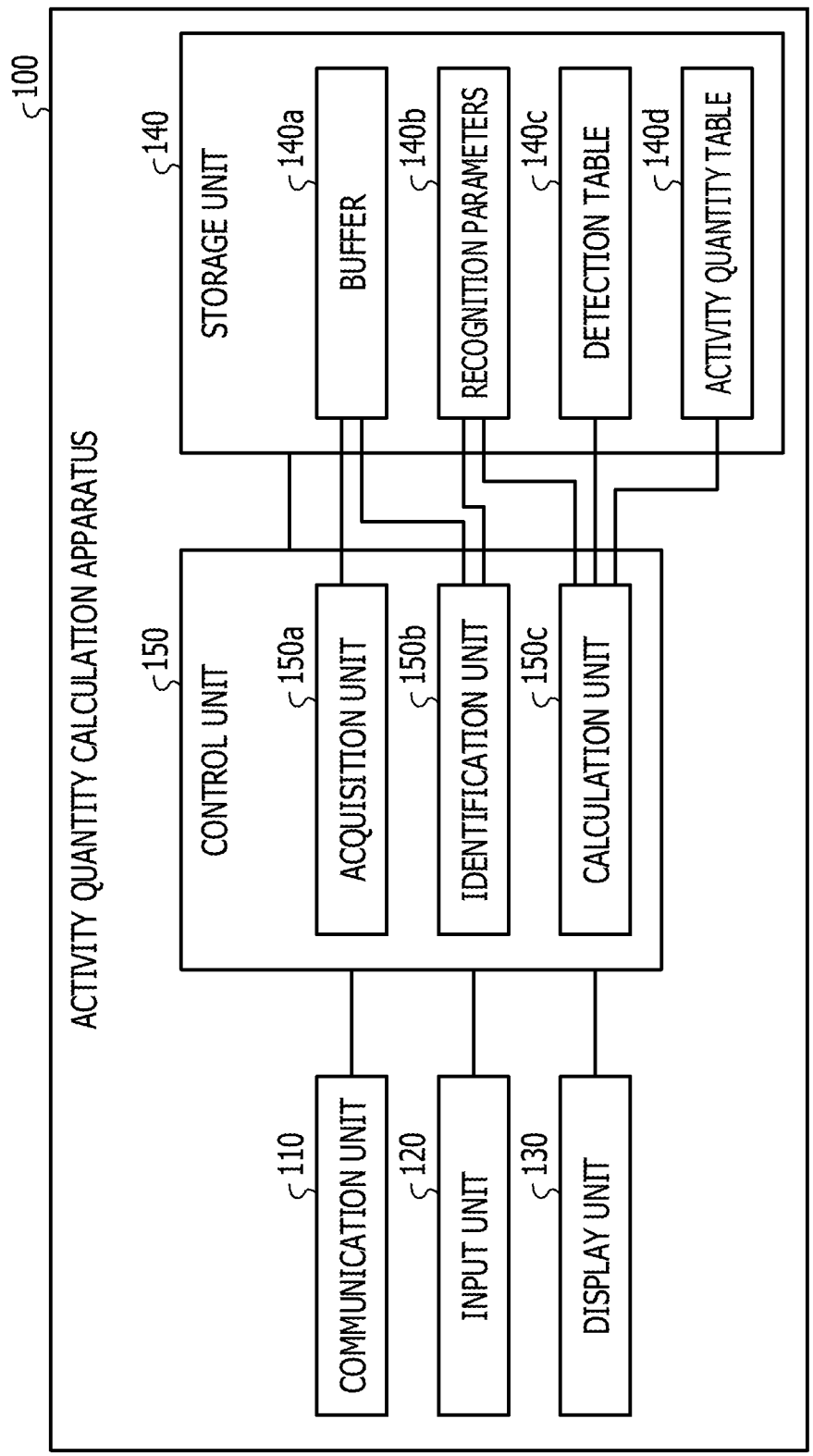
FIG. 2 is a functional block diagram illustrating the configuration of an activity quantity calculation apparatus according to the present embodiment.

FIG. 2 is a functional block diagram illustrating the configuration of an activity quantity calculation apparatus according to the present embodiment. As illustrated in FIG. 2, the activity quantity calculation apparatus 100 includes a communication unit 110, an input unit 120, a display unit 130, a storage unit 140, and a control unit 150.

The communication unit 110 is a processing unit that performs data communication with the camera 10 via the network 50 illustrated in FIG. 1. The control unit 150, described later, receives information of moving images of the cowshed 1 from the camera 10 via the communication unit 110. Also, the communication unit 110 may perform communication with other external devices via the network 50. The communication unit 110 corresponds to a communication device.

The input unit 120 is an input device for inputting various kinds of information to the activity quantity calculation apparatus 100. For example, the input unit 120 corresponds to a keyboard, a mouse, a touch panel, or the like. A manager operates the input unit 120 to set recognition parameters 140b described later, or the like.

The display unit 130 is a display device that displays various kinds of information output from the control unit 150. For example, the display unit 130 corresponds to a liquid crystal display, a touch panel, or the like.

The storage unit 140 includes a buffer 140a, recognition parameters 140b, a detection table 140c, and an activity quantity table 140d. The storage unit 140 corresponds to a semiconductor memory element, such as a random access memory (RAM), a read only memory (ROM), a flash memory, or the like, or a storage device, such as a hard disk drive (HDD), or the like.

The buffer 140a is a buffer that stores information of the moving images transmitted from the camera 10. As described above, the information of moving images is information of a plurality of captured images associated with time.

Figure 3:
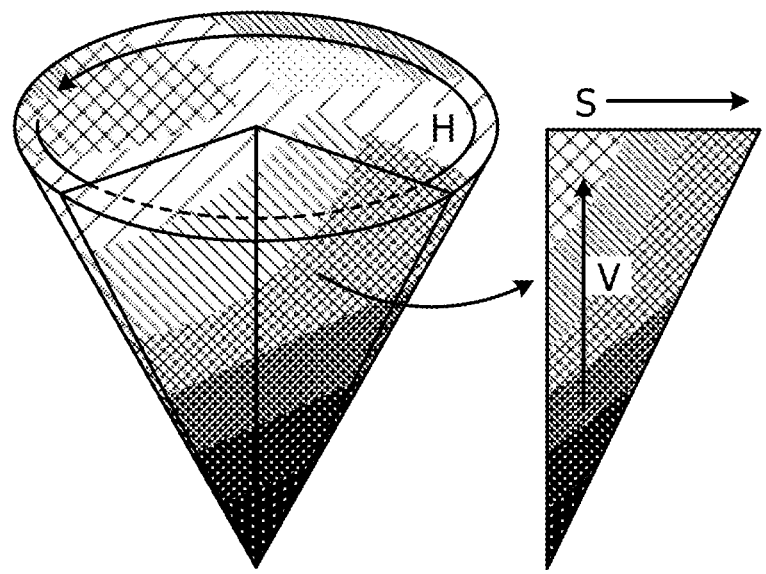
FIG. 3 is a diagram illustrating an example of an HSV color space.

The recognition parameters 140b are pieces of information that define the characteristics of the colors of the collars 6a to 6c to be detected in an HSV (hue, saturation, and brightness) color space. FIG. 3 is a diagram illustrating an example of an HSV color space. The HSV color space includes hue, saturation, and brightness components. For example, hue is a component expressed by value that indicates the kind of color and is defined in the range of 0 to 360°. Saturation is a value that defines vividness of color and is set in the range of 0 to 255. Brightness is a value that indicates lightness of color and is set in the range of 0 to 255.

FIG. 4 is a diagram illustrating an example of the data structure of recognition parameters. As illustrated in FIG. 4, in the recognition parameters 140b, the hue range, the range of saturation, and the range of brightness are associated with each other for each piece of identification information. The identification information is information that uniquely identifies each collar. For example, the hue range of a collar is set so as not to overlap the hue ranges of the other collars. Also, as described later, the hue range of each collar is set in a range that excludes a hue included in a predetermined area of the cowshed 1. In this regard, the range of saturation and brightness for each collar may have overlapping areas.

For example, the hue range corresponding to the collar 6a is "$H_1°$ to $H_2°$", the range of saturation thereof is "140 to 200", and the range of brightness thereof is "$B_1$ to $B_2$". The range of hue corresponding to the collar 6b is "$H_3°$ to $H_4°$", the range of saturation thereof is "140 to 200", and the range of brightness thereof is "$B_1$ to $B_2$". The range of hue corresponding to the collar 6c is "$H_5°$ to $H_6°$", the range of saturation thereof is "140 to 200", and the range of brightness thereof is "$B_1$ to $B_2$".

The detection table 140c is a table holding the position of a collar in the captured image for each time. FIG. 5 is a diagram illustrating an example of the data structure of the detection table. As illustrated in FIG. 5, the detection table 140c associates identification information, time, and coordinates with one another. Identification information refers to information that uniquely identifies a collar. Time refers to when the coordinates are identified. Coordinates refer to the coordinates of the collar detected from the captured image. For example, the first row of the record indicates that the collar 6a is positioned at the coordinates "xa1, ya1" in the image captured at time "$t_1$".

The activity quantity table 140d is a table that holds information regarding the activity quantity of each of the cows 5a to 5c. FIG. 6 is a diagram illustrating an example of the data structure of the activity quantity table. As illustrated in FIG. 6, the activity quantity table 140d associates the identification information with the activity quantity. The identification information is information used uniquely to identify each collar. The activity quantity is information that indicates the activity quantity of a cow fitted with a collar. For example, the activity quantity is a value produced by accumulating the activity quantity in a predetermined time period. In this regard, as illustrated in FIG. 1, it is assumed that if a collar is identified, the corresponding cow is identified.

The control unit 150 includes an acquisition unit 150a, an identification unit 150b, and a calculation unit 150c. It is possible to realize the control unit 150 by using a central processing unit (CPU), a micro processing unit (MPU), or the like. Also, it is possible to realize the control unit 150 by hard-wired logic, such as an application specific integrated circuit (ASIC), a field programmable gate array (FPGA), or the like.

The acquisition unit 150a is a processing unit that receives information of moving images from the camera 10 and records the information of the moving images in the buffer 140a. As described above, the information of the moving images is information including a plurality of consecutive captured images. As described later, it is assumed that in an "activity quantity calculation phase", each captured image includes images of a plurality of collars 6a to 6b (cows 5a to 5c). On the other hand, it is assumed that in a "parameter setting phase", collars are not attached to the cows 5a to 5c.

The identification unit 150b is a processing unit that identifies the ranges of hue of the recognition parameters 140b. The identification unit 150b displays the information of the identified range of hue on the display unit 130. The manager refers to the hue range displayed on the display unit 130 and determines the color of a collar to be attached to a cow. In the following, a description will be given of an example of the processing by the identification unit 150b.

The identification unit 150b operates in the parameter setting phase. In the parameter setting phase, the identification unit 150b obtains, from the buffer 140a, captured images of the cows 5a to 5c that are captured on the condition that the collars are not attached to the cows 5a to 5c. In the following description, the images captured on the condition that the collars are not attached to the cows 5a to 5c are denoted by "set images". Information of whether or not the current phase is the parameter setting phase is notified to the identification unit 150b by the manager operating the input unit 120. Also, in the parameter setting phase, it is assumed that the manager removes the collars from the cows 5a to 5c in advance.

Figure 7:
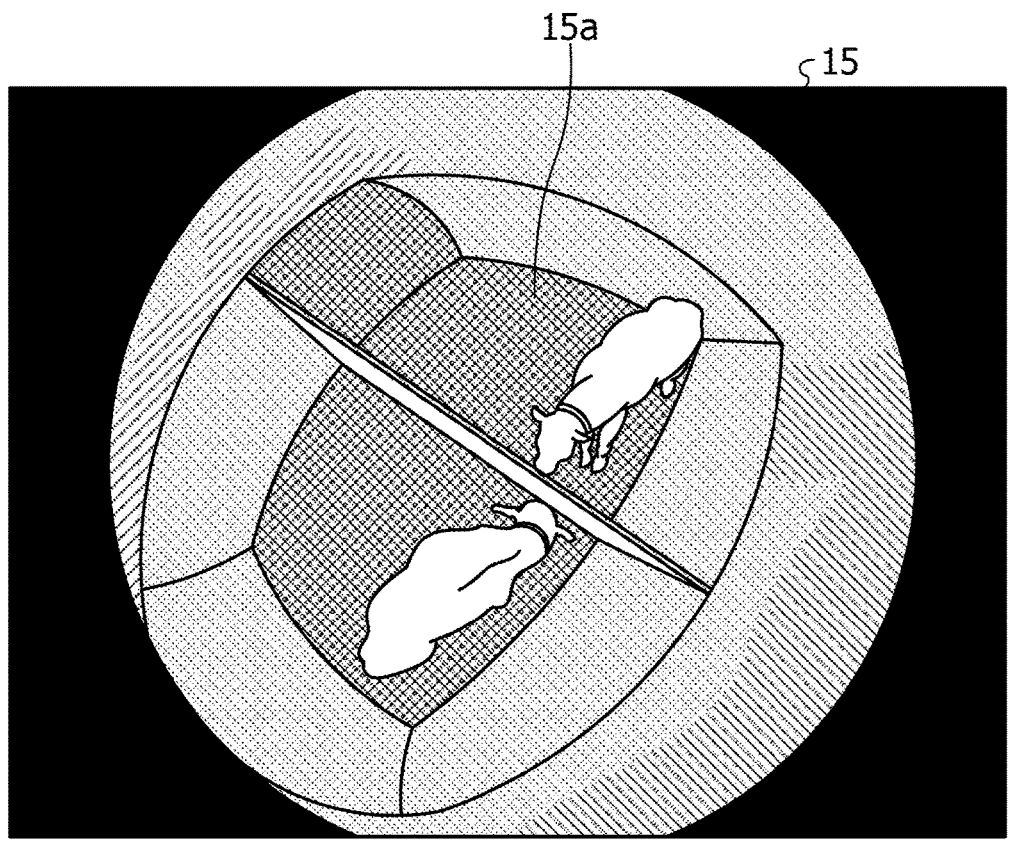
FIG. 7 is an explanatory diagram (1) of an example of the processing of an identification unit.

The identification unit 150b analyzes the image in a predetermined area out of a set image so as to determine the hue included in the predetermined area. FIG. 7 is an explanatory diagram (1) of an example of the processing of an identification unit. In the set image 15 in FIG. 7, a predetermined area 15a is set. The predetermined area 15a is an area covering the activity ranges of the cows 5a to 5c and an area specified by the manager in advance.

The identification unit 150b performs processing for determining the hue in the HSV color space based on a pixel value included in the predetermined area 15a for each pixel so as to identify the hue range of the predetermined area 15a. In the following description, the hue range of the predetermined area 15a is denoted as a "range to be excluded". The identification unit 150b assigns a range that does not overlap the range to be excluded out of the hue range 0° to 360° to the hue range of each piece of identification information.

Figure 8:
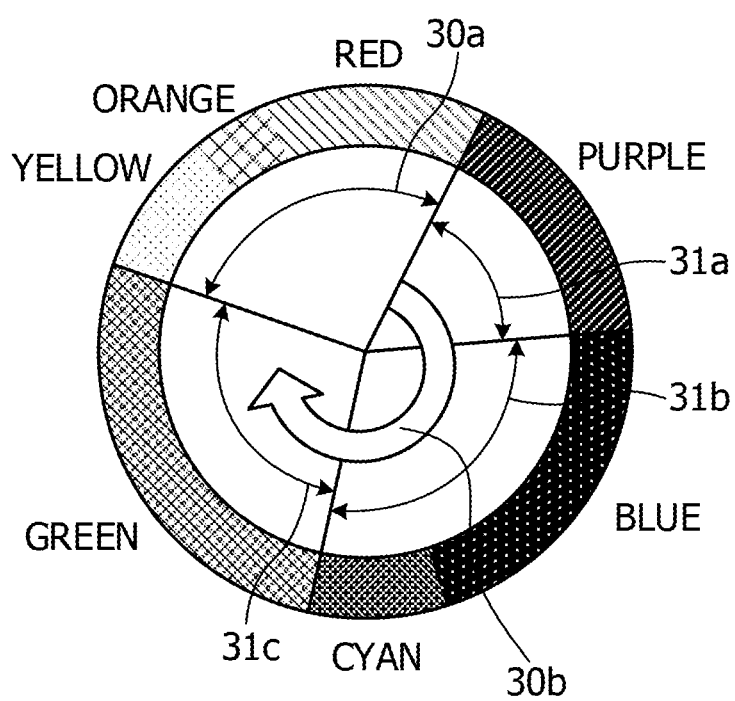
FIG. 8 is an explanatory diagram (2) of an example of the processing of an identification unit.

FIG. 8 is an explanatory diagram (2) of an example of the processing of an identification unit. In FIG. 8, the hue range is denoted by 0° to 360°. For example, if the range to be excluded is a hue range 30a, the identification unit 150b identifies the ranges of hue of the recognition parameters 140b from the hue range 30b. If the number of cows is n, the identification unit 150b divides the hue range 30b equally into n parts and assigns each part to the hue range to be assigned to each collar.

For example, the identification unit 150b identifies the hue range to be assigned to each of the collars 6a to 6c of the respective cows 5a and 5b as the hue ranges 31a, 31b, and 31c and sets the ranges of hue in the recognition parameters 140b. The identification unit 150b displays the information (hue ranges 31a, 31b, and 31c) of the identified range of hue on the display unit 130. The manager refers to the information of the ranges of hue displayed on the display unit 130 and determines the color of individual collars 6a to 6c of the cows 5a and 5b. The manager creates the collars 6a to 6c and then attaches the collars 6a to 6c to the respective cows 5a to 5c.

The manager attaches the collars 6a to 6c to the respective cows 5a to 5c and may then operate the input unit 120 to access the recognition parameters 140b to suitably modify the corresponding relationship between the identification information and the hue range.

The calculation unit 150c operates in the activity quantity calculation phase. In the activity quantity calculation phase, the calculation unit 150c detects the movements of the collars 6a to 6c attached to respective cows 5a to 5c based on a plurality of captured images. The calculation unit 150c calculates the activity quantities of the cows 5a to 5c in accordance with the movements of the collars 6a to 6c. As described later, the calculation unit 150c performs processing for detecting the coordinates of the collars and processing for calculating the activity quantities.

A description will be given of an example of the processing for detecting the collar coordinates. The calculation unit 150c compares the captured image stored in the buffer 140a and the recognition parameters 140b. The calculation unit 150c identifies an area having the hue, the saturation, the brightness that are included in the hue range, the range of saturation, and the range of brightness that are defined in the recognition parameters 140b for each identification information among the area included in the captured image. That is to say, the calculation unit 150c identifies an area corresponding to the hue, the saturation, and the brightness of the identification information "collar 6a", an area corresponding to the hue, the saturation, and the brightness of the identification information "collar 6b", and an area corresponding to the hue, the saturation, and the brightness of the identification information "collar 6c".

The calculation unit 150c determines the center-of-gravity coordinates of each identified area as the coordinates as the collars 6a, 6b, and 6c. The calculation unit 150c records the information that associates time of the captured image and the coordinates of the collars 6a to 6c in the detection table 140c. The calculation unit 150c repeatedly performs the above-described processing for a plurality of captured images so as to record the relationship between each time and the coordinates of the collars 6a to 6c in the detection table 140c.

A description will be given of an example of the processing for calculating an activity quantity. The calculation unit 150c refers to the detection table 140c and calculates the amount of change of a collar in a lapse of a predetermined time period. Here, a description will be given of the case of calculating the activity quantity of the collar 6a (cow 5a) as an example. However, it is possible to calculate the activity quantities of the collars 6b and 6c (the cows 5b and 5c) in the same manner.

The calculation unit 150c refers to the detection table 140c, and calculates the amount of change of the coordinates of the collar 6a for each predetermined time period. It is assumed that the predetermined time period is set by the manager in advance. The calculation unit 150c sums up the amount of change in each predetermined time period to calculate the activity quantity of the collar 6a. The calculation unit 150c associates the identification information with the activity quantity and stores the relationship in the activity quantity table 140d.

Figure 9:
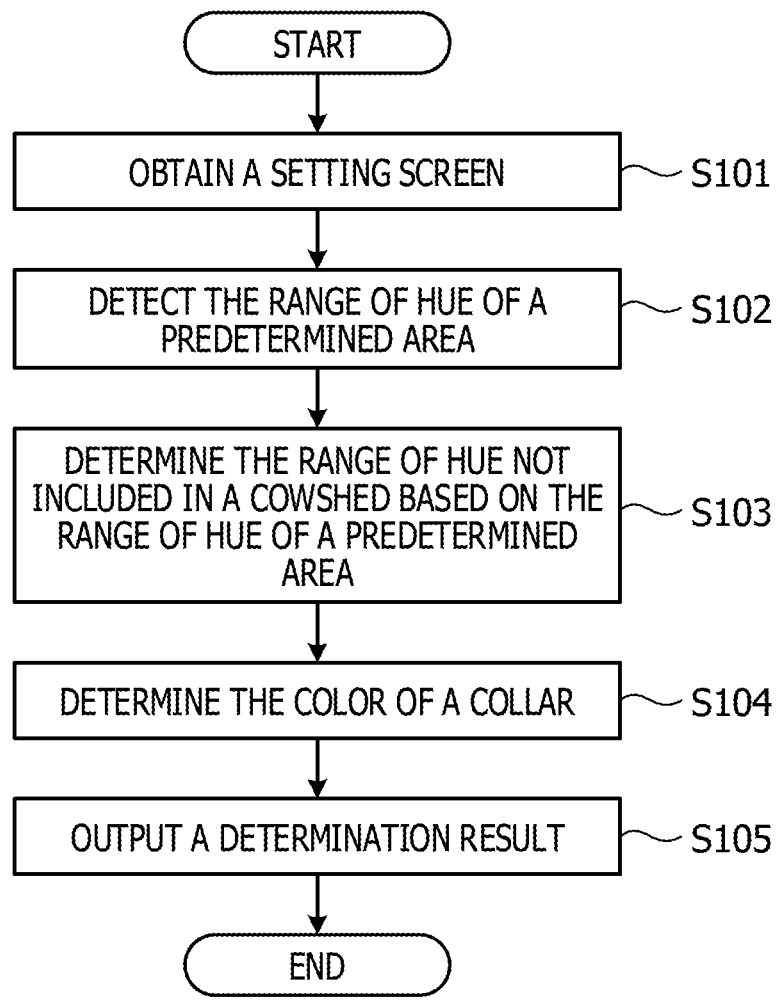
FIG. 9 is a flowchart illustrating a processing procedure for identifying the color of a collar.

Next, a description will be given of the processing procedure of the activity quantity calculation apparatus 100 according to the present embodiment. FIG. 9 is a flowchart illustrating a processing procedure for identifying the color of a collar. As illustrated in FIG. 9, the identification unit 150b of the activity quantity calculation apparatus 100 obtains a set image from the buffer 140a (step S101).

The identification unit 150b detects the hue range of the predetermined area (step S102). The identification unit 150b determines the hue range not included in the cowshed 1 based on the hue range of the predetermined area (step S103).

The identification unit 150b determines a color of each collar (step S104). The identification unit 150b outputs the determination result (step S105).

Figure 10:
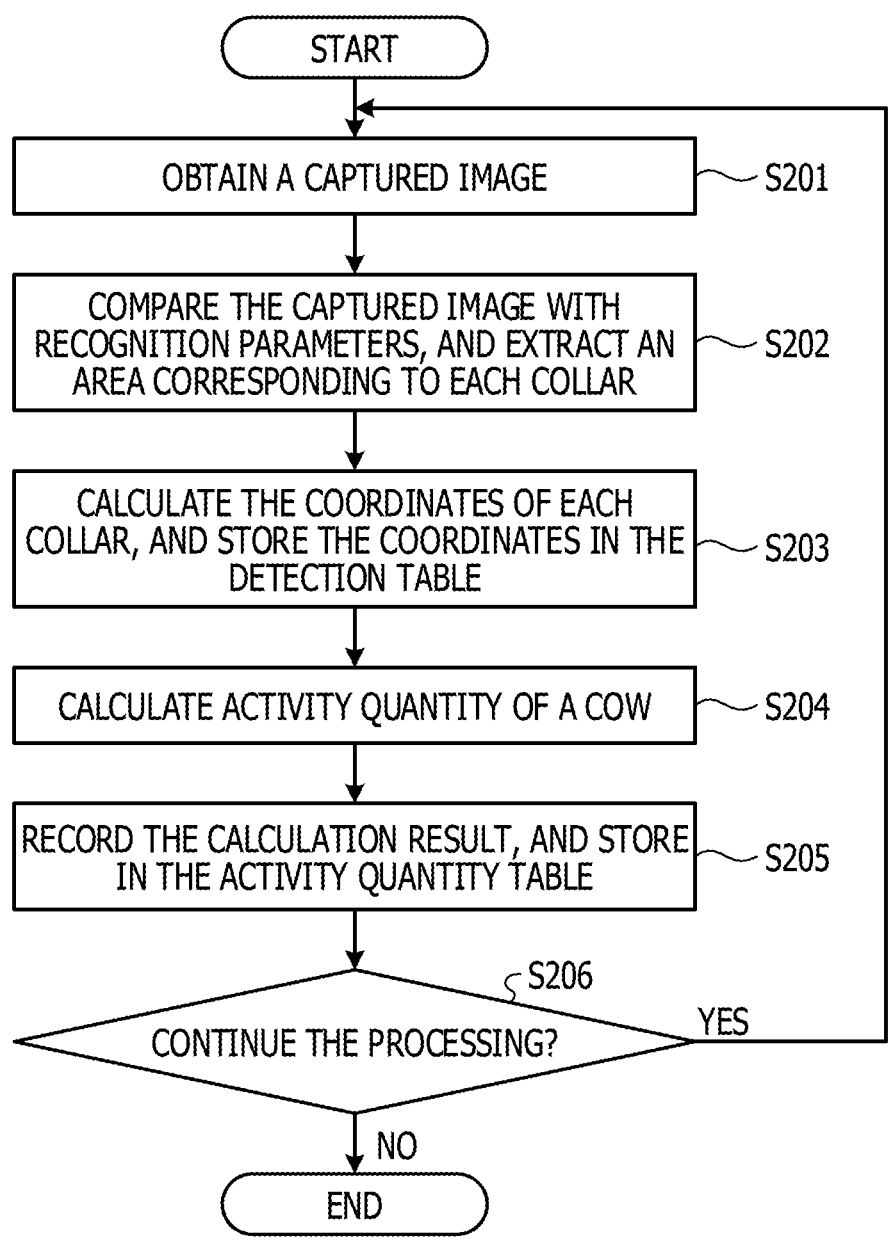
FIG. 10 is a flowchart illustrating a processing procedure for calculating the activity quantity of a cow.

FIG. 10 is a flowchart illustrating a processing procedure for calculating the activity quantity of a cow. As illustrated in FIG. 10, the calculation unit 150c of the activity quantity calculation apparatus 100 obtains a captured image from the buffer 140a (step S201).

The calculation unit 150c compares the captured image and the recognition parameters 140b and extracts an area corresponding to each of the collars 6a to 6c (step S202). The calculation unit 150c calculates the coordinates of each of the collars 6a to 6c, and stores the coordinates in the detection table 140c (step S203).

The calculation unit 150c calculates the activity quantity of a cow (step S204). The calculation unit 150c stores the calculation result in the activity quantity table 140d (step S205). If the calculation unit 150c continues the processing (step S206, Yes), the processing proceeds to step S201. If the calculation unit 150c does not continue the processing (step S206, No), the processing is terminated.

Next, a description will be given of the advantages of the activity quantity calculation apparatus 100 according to the present embodiment. The activity quantity calculation apparatus 100 repeats the processing for detecting the position of a collar that is attached to each cow and that has a different color with each other from the captured image, and calculates the amount of movement of each cow. Accordingly, in the case where a plurality of cows are included in a captured image, it is possible to calculate the activity quantities of the plurality of cows. In the present embodiment, a description has been given using cows, but it is possible to calculate the activity quantity of the other animals in the same manner.

Also, the activity quantity calculation apparatus 100 identifies the colors included in a set image having a predetermined range captured by the camera 10 as the imaging range and outputs candidate colors of the collars in accordance with the identified colors. Thereby, the hue range of a collar is set so as not to overlap the hue range of the other collars. Also, the hue range of each collar is set in the range not including the hue included in a predetermined area of the cowshed 1. Accordingly, it is possible to correctly detect the coordinates of each collar while distinguishing each collar.

Figure 11:
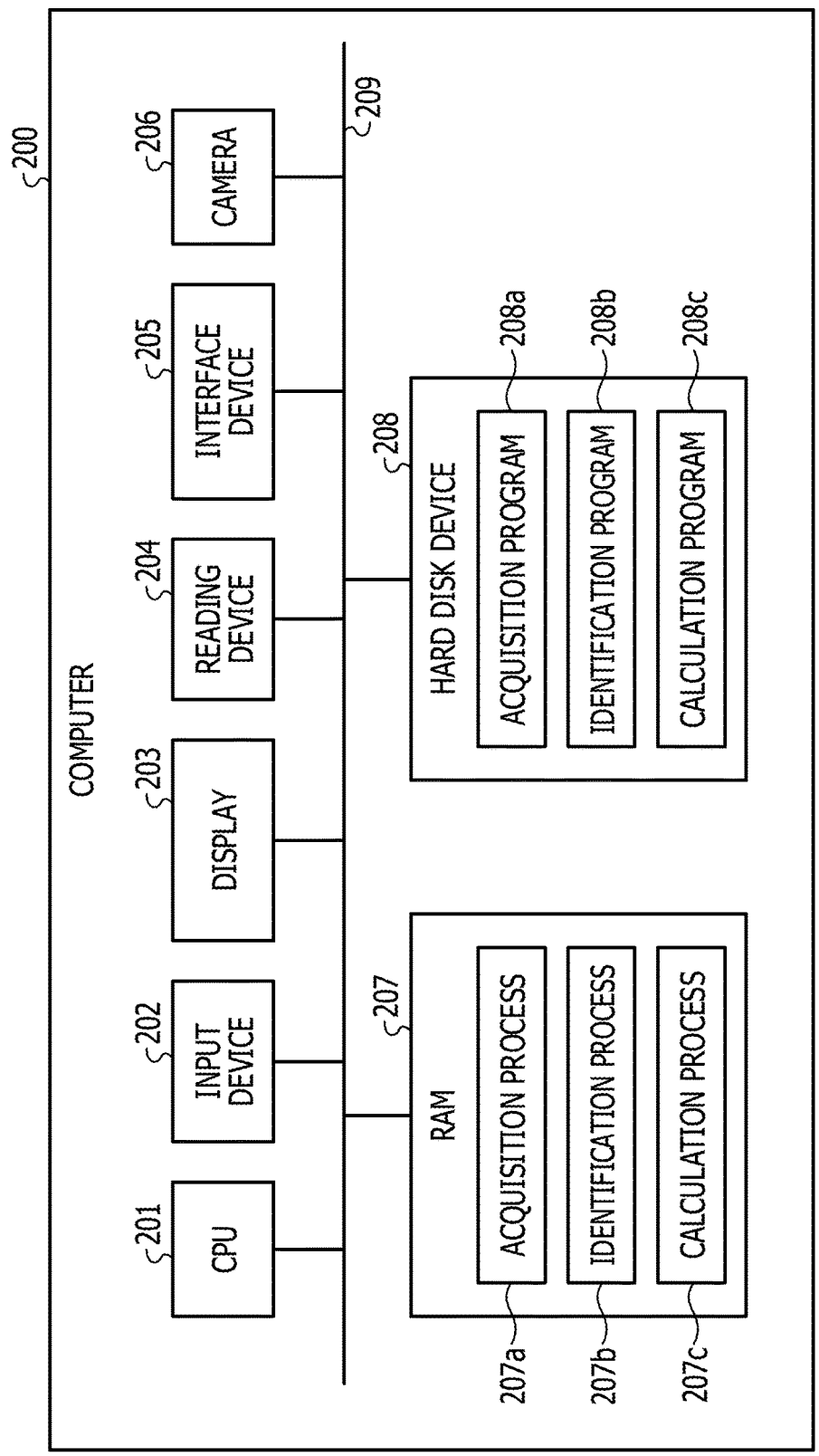
FIG. 11 is a diagram illustrating an example of the hardware configuration of a computer that realizes the same functions as those of the activity quantity calculation apparatus.

Next, a description will be given of an example of the hardware configuration of a computer that realizes the same functions as those of the activity quantity calculation apparatus 100 illustrated in the embodiment described above. FIG. 11 is a diagram illustrating an example of the hardware configuration of a computer that realizes the same functions as those of the activity quantity calculation apparatus.

As illustrated in FIG. 7, a computer 200 includes a CPU 201 that performs various kinds of calculation processing, an input device 202 that receives data from a user, and a display 203. Also, the computer 200 includes a reading device 204 that reads a program, or the like from a storage medium, and an interface device 205 that transmits data to and receives data from the other computers via a network. The computer 200 includes a camera 206. Also, the computer 200 includes a RAM 207 that temporarily stores various kinds of information and a hard disk device 208. Then each of the devices 201 to 208 is coupled to a bus 209.

The hard disk device 208 has an acquisition program 208a, an identification program 208b, and a calculation program 208c. The CPU 201 reads the acquisition program 208a, the identification program 208b, and the calculation program 208c and loads the programs into the RAM 207.

The acquisition program 208a functions as an acquisition process 207a. The identification program 208b functions as an identification process 207b. The calculation program 208c functions as a calculation process 207c.

The processing of the acquisition process 207a corresponds to the processing of the reception unit 150a. The processing of the identification process 207b corresponds to the processing of the identification unit 150b. The processing of the calculation process 207c corresponds to the processing of the calculation unit 150c.

In this regard, each of the programs 208a to 208c does not have to be stored in the hard disk device 208 from the beginning. For example, each program is stored in a "portable physical medium", such as a flexible disk (FD), a CD-ROM, a DVD disc, a magneto-optical disk, an IC card, or the like that is to be inserted into the computer 200. Then the computer 200 may read and execute each of the programs 208a to 208c.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method performed by a computer, the method comprising:
  executing a first process when a plurality of animals are not attached with a plurality of attachment objects respectively, the first process being configured to
    obtain first images captured by a camera, each of the first images including the plurality of animals in a first condition, the first condition being a condition that each of the plurality of animals are not attached with any of the plurality of attachment objects,
    identify one or more of first colors different from any of colors included in the first images,
    output the one or more of first colors as candidate colors attached to the plurality of attachment objects; and
  executing a second process when the plurality of animals are attached with the plurality of attachment objects respectively, the second process being configured to
    obtain second images captured by the camera, each of the second images including the plurality of animals in a second condition, the second condition being a condition that each of the plurality of animals are attached with any of the plurality of attachment objects, the attachment objects having respective different colors and having any of the one or more of the first colors,
    by using at least one image among the second images and the one or more of first colors, detect locations of the plurality of attachment objects respectively,
    by using the second images, detect movements of the plurality of respective attachment objects, based on the detected locations of the plurality of attachment objects, and
    in accordance with the respective movements of the plurality of attachment objects, determining respective activity quantities of the plurality of animals.

2. An information processing apparatus comprising:
a memory; and
a processor coupled to the memory and configured to:
execute a first process when a plurality of animals are not attached with a plurality of attachment objects respectively, the first process being configured to
obtain first images captured by a camera, each of the first images including the plurality of animals in a first condition, the first condition being a condition that each of the plurality of animals are not attached with any of the plurality of attachment objects,
identify one or more of first colors different from any of colors included in the first images,
output the one or more of first colors as candidate colors attached to the plurality of attachment objects; and
execute a second process when the plurality of animals are attached with the plurality of attachment objects respectively, the second process being configured to
obtain second images captured by the camera, each of the second images including the plurality of animals in a second condition, the second condition being a condition that each of the plurality of animals are attached with any of the plurality of attachment objects, the attachment objects having respective different colors and having any of the one or more of the first colors,
by using at least one image among the second images and the one or more of first colors, detect locations of the plurality of attachment objects respectively,
by using the second images, detect movements of the plurality of respective attachment objects, based on the detected locations of the plurality of attachment objects, and
in accordance with the respective movements of the plurality of attachment objects, determine respective activity quantities of the plurality of animals.

3. A non-transitory computer-readable storage medium storing a program that causes an information processing apparatus to execute a process, the process comprising:
executing a first process when a plurality of animals are not attached with a plurality of attachment objects respectively, the first process being configured to
obtain first images captured by a camera, each of the first images including the plurality of animals in a first condition, the first condition being a condition that each of the plurality of animals are not attached with any of the plurality of attachment objects,
identify one or more of first colors different from any of colors included in the first images,
output the one or more of first colors as candidate colors attached to the plurality of attachment objects; and
executing a second process when the plurality of animals are attached with the plurality of attachment objects respectively, the second process being configured to
obtain second images captured by the camera, each of the second images including the plurality of animals in a second condition, the second condition being a condition that each of the plurality of animals are attached with any of the plurality of attachment objects, the attachment objects having respective different colors and having any of the one or more of the first colors,
by using at least one image among the second images and the one or more of first colors, detect locations of the plurality of attachment objects respectively,
by using the second images, detect movements of the plurality of respective attachment objects, based on the detected locations of the plurality of attachment objects, and
in accordance with the respective movements of the plurality of attachment objects, determining respective activity quantities of the plurality of animals.

\* \* \* \* \*